US012646456B2

(12) United States Patent
Kim et al.

(10) Patent No.: US 12,646,456 B2
(45) Date of Patent: Jun. 2, 2026

(54) PIXEL CIRCUIT AND DISPLAY DEVICE INCLUDING THE SAME

(71) Applicant: LG Display Co., Ltd., Seoul (KR)

(72) Inventors: Kyu-Jin Kim, Seoul (KR); Taehun Kim, Seoul (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 18/367,277

(22) Filed: Sep. 12, 2023

(65) Prior Publication Data

US 2024/0185784 A1 Jun. 6, 2024

(30) Foreign Application Priority Data

Dec. 1, 2022 (KR) ........................ 10-2022-0165388

(51) Int. Cl.
*G09G 3/3233* (2016.01)
*G09G 3/3291* (2016.01)

(52) U.S. Cl.
CPC ......... *G09G 3/3233* (2013.01); *G09G 3/3291* (2013.01); *G09G 2300/0842* (2013.01); *G09G 2310/0294* (2013.01); *G09G 2320/0233* (2013.01)

(58) Field of Classification Search
CPC ... G09G 3/32–3291; G09G 2300/0809; G09G 2300/0819; G09G 2300/0842; G09G 2320/0209–0223; G09G 2320/0233; G09G 2320/0247; G09G 2320/0257; G09G 2320/0693
See application file for complete search history.

(56) References Cited

U.S. PATENT DOCUMENTS

2009/0322726 A1* 12/2009 Takasugi .............. G09G 3/3233 345/211
2016/0125809 A1 5/2016 Hwang
2020/0226978 A1* 7/2020 Lin ...................... G09G 3/3233
(Continued)

FOREIGN PATENT DOCUMENTS

CN 115394252 A 11/2022
JP 2022-87805 A 6/2022
(Continued)

*Primary Examiner* — Nathan Danielsen
(74) *Attorney, Agent, or Firm* — Birch, Stewart, Kolasch & Birch, LLP

(57) ABSTRACT

A pixel circuit for a display device can include a light-emitting element configured to emit light based on driving current, a driving transistor to control the driving current, and a storage capacitor. The driving transistor includes a gate electrode, a source electrode, and a drain electrode, where a data voltage is applied to the source electrode. An anode electrode of the light-emitting element is coupled to the drain electrode. Further, the storage capacitor has a first electrode connected to a high-potential voltage and a second electrode coupled to the gate electrode of the driving transistor. During an initialization period of a refresh period of the display device, the pixel circuit applies a first initialization voltage to the second electrode of the storage capacitor, applies a second initialization voltage to the anode electrode of the light-emitting element, and applies an on bias stress voltage to the source electrode of the driving transistor.

17 Claims, 11 Drawing Sheets

(56) References Cited

U.S. PATENT DOCUMENTS

| | | | | |
|---|---|---|---|---|
| 2022/0122534 | A1* | 4/2022 | Kim | G09G 3/3233 |
| 2022/0173189 | A1 | 6/2022 | Kim et al. | |
| 2022/0335872 | A1* | 10/2022 | Zhang | G09G 3/3233 |
| 2022/0343850 | A1 | 10/2022 | Li et al. | |
| 2022/0358881 | A1 | 11/2022 | Chae et al. | |
| 2024/0078976 | A1* | 3/2024 | Cheng | G09G 3/3233 |
| 2024/0144880 | A1* | 5/2024 | Zhu | G09G 3/3233 |

FOREIGN PATENT DOCUMENTS

| | | | |
|---|---|---|---|
| KR | 10-2022-0094952 | A | 7/2022 |
| WO | WO 2015/063981 | A1 | 5/2015 |
| WO | WO 2022/118368 | A1 | 6/2022 |

* cited by examiner

PIXEL CIRCUIT AND DISPLAY DEVICE INCLUDING THE SAME

CROSS-REFERENCE TO RELATED APPLICATION

This application claims priority to Korean Patent Application No. 10-2022-0165388 filed on Dec. 1, 2022 in the Republic of Korea, the entire contents of which are hereby expressly incorporated by reference into the present application.

BACKGROUND OF THE DISCLOSURE

Field

The present disclosure relates to a display device, and more particularly, to a pixel circuit and a display device including the pixel circuit.

Discussion of the Related Art

As the information society develops, a demand for display devices for displaying images is increasing in various forms. Various display devices such as liquid crystal display devices and organic light-emitting display devices are being utilized.

The organic light-emitting display device does not require a separate light source and thus is in the spotlight as a means for vivid color display. The organic light-emitting display device includes an organic light-emitting diode (OLED) that emits light by itself and thus has advantages such as a fast response speed, a high contrast ratio, a high luminous efficiency, a high luminance and a wide viewing angle.

The organic light-emitting display device displays an image based on light generated from a light-emitting element in a pixel, and thus has various advantages. However, a uniformity related limitation due to coupling between lines inside a pixel or mura such as flicker and stains due to an operation condition of a driving signal may occur during an operation thereof. This limitation can be a factor contributing to a deterioration of image quality satisfaction of the display device.

The description provided in the background section should not be assumed to be prior art merely because it is mentioned in or associated with the background section. The background section can include information that describes one or more aspects of the subject technology.

SUMMARY OF THE DISCLOSURE

In an organic light-emitting display device, when luminance changes rapidly due to a limitation in a pixel structure, the luminance does not immediately change to a target luminance but changes to intermediate luminance, and then changes to the target luminance, which can result in a poor first frame refresh (FFR) measurement value. As a result, a moving picture response time (MPRT) can slow down and a smearing phenomenon may occur.

Further, when the luminance of the first frame is greatly reduced, luminance of second and third frames may adversely affected, which can deteriorate the image quality.

Accordingly, the present disclosure is directed to a pixel circuit and a display device including the same that substantially obviate one or more of the issues due to limitations and disadvantages of the related art.

For example, the inventors of the present disclosure have invented a display device capable of improving a first frame refresh (FFR) to improve the image quality satisfaction.

A technical purpose according to one or more embodiments of the present disclosure is to provide a pixel circuit in which a parasitic capacitor of a driving transistor is charged with a certain voltage in an initialization period of a refresh period to reduce or completely exclude influence by a previous frame, and to provide a display device including the pixel circuit.

Purposes according to the present disclosure are not limited to the above-mentioned purpose. Other purposes and advantages according to the present disclosure that are not mentioned can be understood based on following descriptions, and can be more clearly understood based on embodiments according to the present disclosure. Further, it will be easily understood that the purposes and advantages according to the present disclosure can be realized using features shown in the claims or combinations thereof.

A pixel circuit according to an embodiment of the present disclosure can include a light-emitting element for emitting light based on driving current; a driving transistor configured to control the driving current, wherein the driving transistor includes a gate electrode, a source electrode, and a drain electrode, wherein a data voltage is applied to the source electrode thereof, wherein an anode electrode of the light-emitting element is coupled to the drain electrode thereof; and a storage capacitor having one electrode connected to a high-potential voltage and the other electrode coupled to the gate electrode of the driving transistor, wherein during an initialization period of a refresh period of a display device including the pixel circuit, the pixel circuit is configured to apply a first initialization voltage to the other electrode of the storage capacitor, to apply a second initialization voltage to the anode electrode of the light-emitting element, and to apply an on bias stress voltage to the source electrode of the driving transistor.

A display device according to an embodiment of the present disclosure can include a display panel including a plurality of pixel circuits; and a driver for driving the display panel, wherein each of the plurality of pixel circuits includes: a light-emitting element for emitting light based on driving current; a driving transistor configured to control the driving current, wherein the driving transistor includes a gate electrode, a source electrode, and a drain electrode, wherein a data voltage is applied to the source electrode thereof, wherein an anode electrode of the light-emitting element is coupled to the drain electrode thereof; and a storage capacitor having one electrode connected to a high-potential voltage and the other electrode coupled to the gate electrode of the driving transistor, wherein during an initialization period of a refresh period of the display device, each pixel circuit is configured to apply a first initialization voltage to the other electrode of the storage capacitor, to apply a second initialization voltage to the anode electrode of the light-emitting element, and to apply an on bias stress voltage to the source electrode of the driving transistor.

A display device according to an embodiment of the present disclosure can include a plurality of pixel circuits, wherein each of the plurality of pixel circuits includes: a light-emitting element for emitting light based on driving current; a driving transistor configured to control the driving current, wherein the driving transistor includes a gate electrode, a source electrode, and a drain electrode; a first transistor connected to and disposed between the gate electrode and the drain electrode of the driving transistor; a second transistor configured to apply a data voltage to the source electrode of the driving transistor; a third transistor configured to apply a high-potential voltage to the source electrode of the driving transistor; a fourth transistor configured to generate a current path between the driving transistor and the light-emitting element; a fifth transistor configured to apply a first initialization voltage to the gate electrode of the driving transistor; a sixth transistor configured to apply a second initialization voltage to an anode electrode of the light-emitting element; a storage capacitor having one electrode connected to the high-potential voltage and the other electrode coupled to the gate electrode of the driving transistor; and a seventh transistor configured to apply an on bias stress voltage to the source electrode of the driving transistor.

Additional features and aspects of the disclosure are set forth in part in the description that follows and in part will become apparent from the description or can be learned by practice of the inventive concepts provided herein. Other features and aspects of the inventive concepts can be realized and attained by the structures pointed out in the present disclosure, or derivable therefrom, and the claims hereof as well as the appended drawings.

According to embodiments, during the initialization period of the refresh period, the parasitic capacitor of the driving transistor can be charged with a certain voltage, such that the influence of the previous frame can be reduced or completely excluded.

Further, during the initialization period of the refresh period, a certain voltage can be applied to the source electrode of the driving transistor to initialize the parasitic capacitor, such that the luminance of the first frame can be improved.

Further, the luminance of the first frame can be improved to reduce or prevent the luminance of the second and third frames from being adversely affected by the lowered luminance of the first frame, such that the image quality can be improved.

Effects of the present disclosure are not limited to the effects mentioned above, and other effects not mentioned will be clearly understood by those skilled in the art from the descriptions below.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, that may be included to provide a further understanding of the disclosure and can be incorporated in and constitute a part of the disclosure, illustrate embodiments of the disclosure and together with the description serve to explain various principles of the disclosure.

DETAILED DESCRIPTION OF THE EMBODIMENTS

Figure 1:
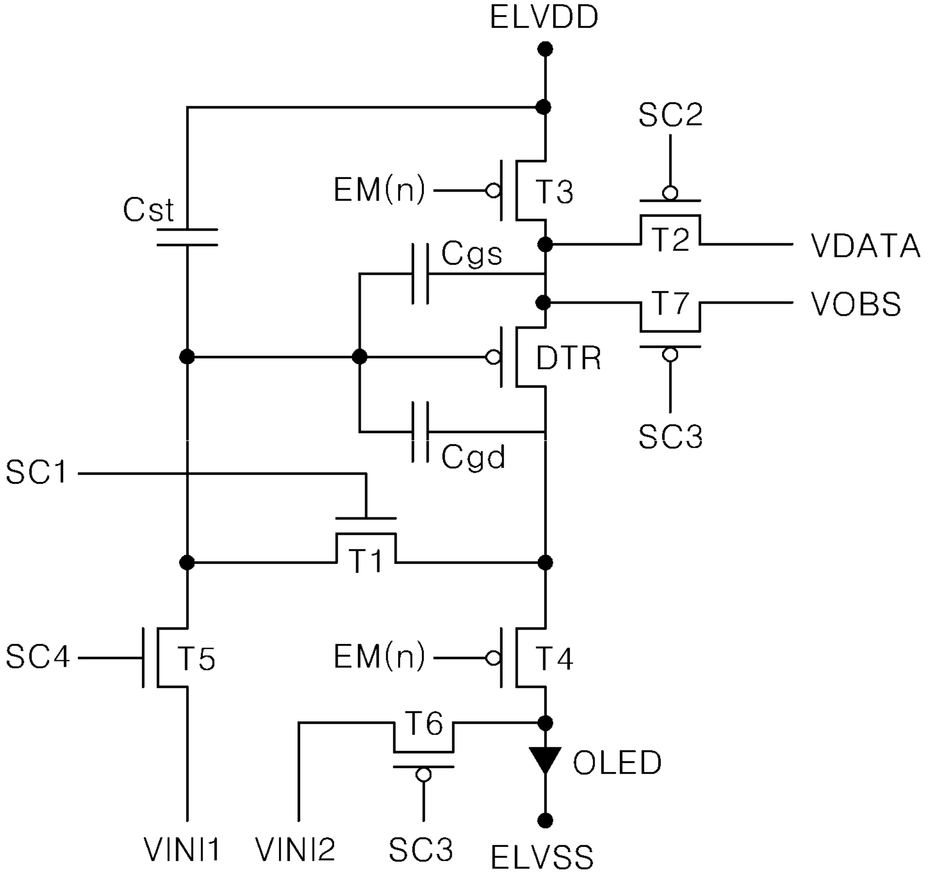
FIG. 1 is a circuit diagram showing a pixel circuit of a display device according to an exemplary embodiment of the present disclosure.

Reference will now be made in detail to embodiments of the present disclosure, examples of which can be illustrated in the accompanying drawings. In the following description, when a detailed description of well-known functions or configurations related to this document is determined to unnecessarily cloud a gist of the inventive concept, the detailed description thereof will be omitted. The progression of processing steps and/or operations described is an example; however, the sequence of steps and/or operations is not limited to that set forth herein and can be changed as is known in the art, with the exception of steps and/or operations necessarily occurring in a particular order. Like reference numerals designate like elements throughout. Names of the respective elements used in the following explanations can be selected only for convenience of writing the specification and can be thus different from those used in actual products.

Advantages and features of the present disclosure, and a method of achieving the advantages and features will become apparent with reference to example embodiments described later in detail together with the accompanying drawings. However, the present disclosure is not limited to the example embodiments as disclosed below, but can be implemented in various different forms. Thus, these example embodiments are set forth only to make the present disclosure complete, and to completely inform the scope of the present disclosure to those of ordinary skill in the technical field to which the present disclosure belongs.

A shape, a size, a ratio, an angle, a number, etc. disclosed in the drawings for describing the embodiments of the present disclosure are exemplary, and the present disclosure is not limited thereto. The same reference numerals refer to the same elements herein. Further, descriptions and details of well-known steps and elements are omitted for simplicity of the description. Furthermore, in the following detailed description of the present disclosure, numerous specific details are set forth in order to provide a thorough understanding of the present disclosure. However, it will be understood that the present disclosure can be practiced without these specific details. In other instances, well-known methods, procedures, components, and circuits have not been described in detail so as not to unnecessarily obscure aspects of the present disclosure.

The terminology used herein is directed to the purpose of describing particular embodiments only and is not intended to be limiting of the present disclosure. As used herein, the singular constitutes "a" and "an" are intended to include the plural constitutes as well, unless the context clearly indicates otherwise. It will be further understood that the terms "comprise", "including", "include", and "including" when used in this specification, specify the presence of the stated features, integers, operations, elements, and/or components, but do not preclude the presence or addition of one or more other features, integers, operations, elements, components, and/or portions thereof. As used herein, the term "and/or" includes any and all combinations of one or more of the associated listed items. Expressions such as "at least one of" when preceding a list of elements can modify the entire list of elements and may not modify the individual elements of the list. In interpretation of numerical values, an error or tolerance therein can occur even when there is no explicit description thereof. Any implementation described herein as an "example" is not necessarily to be construed as preferred or advantageous over other implementations.

In addition, it will also be understood that when a first element or layer is referred to as being present "on" a second element or layer, the first element can be disposed directly on the second element or can be disposed indirectly on the second element with a third element or layer being disposed between the first and second elements or layers. It will be understood that when an element or layer is referred to as being "connected to", or "coupled to" another element or layer, it can be directly on, connected to, or coupled to the other element or layer, or one or more intervening elements or layers can be present. In addition, it will also be understood that when an element or layer is referred to as being "between" two elements or layers, it can be the only element or layer between the two elements or layers, or one or more intervening elements or layers can also be present.

Further, as used herein, when a layer, film, region, plate, or the like can be disposed "on" or "on a top" of another layer, film, region, plate, or the like, the former can directly contact the latter or still another layer, film, region, plate, or the like can be disposed between the former and the latter. As used herein, when a layer, film, region, plate, or the like is directly disposed "on" or "on a top" of another layer, film, region, plate, or the like, the former directly contacts the latter and still another layer, film, region, plate, or the like is not disposed between the former and the latter. Further, as used herein, when a layer, film, region, plate, or the like can be disposed "below" or "under" another layer, film, region, plate, or the like, the former can directly contact the latter or still another layer, film, region, plate, or the like can be disposed between the former and the latter. As used herein, when a layer, film, region, plate, or the like is directly disposed "below" or "under" another layer, film, region, plate, or the like, the former directly contacts the latter and still another layer, film, region, plate, or the like is not disposed between the former and the latter.

In descriptions of temporal relationships, for example, temporal precedent relationships between two events such as "after", "subsequent to", "before", etc., another event can occur therebetween unless "directly after", "directly subsequent" or "directly before" is not indicated.

It will be understood that, although the terms "first", "second", "third", and so on can be used herein to describe various elements, components, regions, layers and/or sections, these elements, components, regions, layers and/or sections should not be limited by these terms. These terms are used to distinguish one element, component, region, layer or section from another element, component, region, layer or section, and may not define order or sequence. Thus, a first element, component, region, layer or section described below could be termed a second element, component, region, layer or section, without departing from the technical idea and scope of the present disclosure.

The features of the various embodiments of the present disclosure can be partially or entirely combined with each other, and can be technically associated with each other or operate with each other. The embodiments can be implemented independently of each other and can be implemented together in an association relationship.

In interpreting a numerical value, the value is interpreted as including an error range unless there is no separate explicit description thereof.

It will be understood that when an element or layer is referred to as being "connected to", or "coupled to" another element or layer, it can be directly on, connected to, or coupled to the other element or layer, or one or more intervening elements or layers can be present. In addition, it will also be understood that when an element or layer is referred to as being "between" two elements or layers, it can be the only element or layer between the two elements or layers, or one or more intervening elements or layers can also be present.

The features of the various embodiments of the present disclosure can be partially or entirely combined with each other, and can be technically associated with each other or operate with each other. The embodiments can be implemented independently of each other and can be implemented together in an association relationship.

Unless otherwise defined, all terms including technical and scientific terms used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, a pixel circuit and a display device including the pixel circuit according to some embodiments of the present disclosure will be described. All the components of each pixel circuit and each display device according to all embodiments of the present disclosure are operatively coupled and configured.

FIG. 1 is a circuit diagram showing a pixel circuit of a display device according to an exemplary embodiment of the present disclosure.

Referring to FIG. 1, the display device according to the exemplary embodiment of the present disclosure includes a plurality of pixel circuits. Each of the plurality of pixel circuits includes a light-emitting element OLED, a driving transistor DTR, a first transistor T1, a second transistor T2, a third transistor T3, a fourth transistor T4, a fifth transistor T5, a sixth transistor T6, a seventh transistor T7, and a storage capacitor Cst.

The light-emitting element OLED emits light based on driving current. The light-emitting element OLED can include an anode electrode, a cathode electrode, and an organic light-emitting layer between the anode electrode and the cathode electrode. For example, the cathode electrode of the light-emitting element OLED can be connected to a low-potential voltage ELVSS.

The driving transistor DTR controls the driving current, and includes a gate electrode, a source electrode and a drain electrode. The source electrode of the driving transistor DTR is applied with a data voltage VDATA, and the anode electrode of the light-emitting element OLED is coupled to the drain electrode of the driving transistor DTR through the fourth transistor T4. In another example, the source electrode of the driving transistor DTR can also be applied with an on bias stress voltage VOBS for a time period.

The first transistor T1 operates in response to a first scan signal SC1 and is connected to and disposed between the gate electrode and the drain electrode of the driving transistor DTR. The second transistor T2 operates in response to a second scan signal SC2 and applies the data voltage VDATA to the source electrode of the driving transistor DTR. The third transistor T3 operates in response to an emission signal EM(n) (e.g., n can be a positive number such as a positive integer) and applies a high-potential voltage ELVDD to the source electrode of the driving transistor DTR.

The fourth transistor T4 operates in response to the emission signal EM(n) and generates a current path between the driving transistor DTR and the light-emitting element OLED. The fifth transistor T5 operates in response to a fourth scan signal SC4 and applies a first initialization voltage VINI1 to the gate electrode of the driving transistor DTR. The sixth transistor T6 operates in response to a third scan signal SC3 and applies a second initialization voltage VINI2 to the anode electrode of the light-emitting element OLED.

The storage capacitor Cst has one electrode connected to the high-potential voltage ELVDD and the other electrode coupled to the gate electrode of the driving transistor DTR. The seventh transistor T7 can operates in response to the third scan signal SC3 or another scan signal different from SC3, and can apply an on bias stress voltage VOBS to the source electrode of the driving transistor DTR.

It is to be noted that although FIG. 1 shows the circuit diagram of the pixel circuit according to the present disclosure as an example, however, embodiments of the present disclosure is not limited thereto. For example, the pixel circuit can have various other structures. For example, 3T1C, 4T1C, 5T1C, 3T2C, 4T2C, 5T2C, 6T2C, 7T1C, 7T2C, 8T2C and the like structures are also possible, and more or less transistors and capacitors could be included, as long as a parasitic capacitor of the driving transistor DTR can be charged with a certain voltage in an initialization period of a refresh period to reduce or completely exclude influence by a previous frame.

Figure 2:
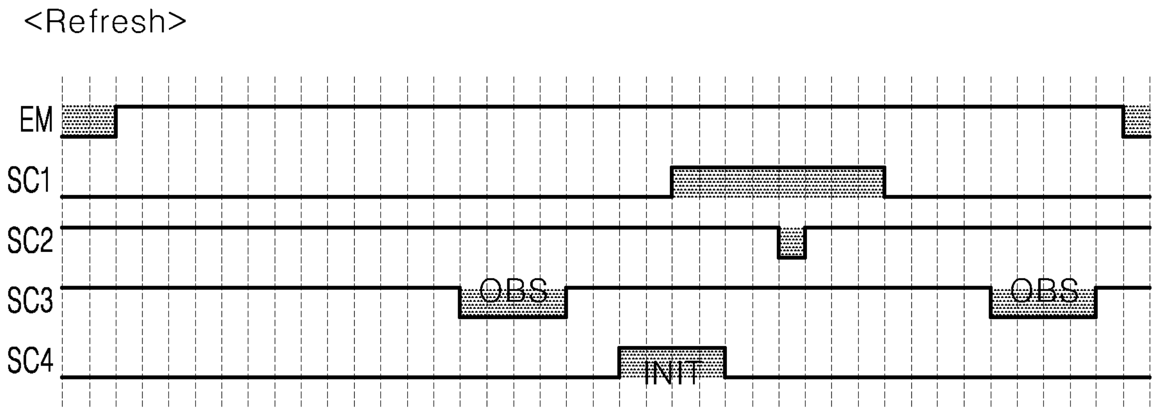
FIG. 2 is an example of a timing diagram of a refresh period in the display device according to the exemplary embodiment of the present disclosure.
Figure 3:
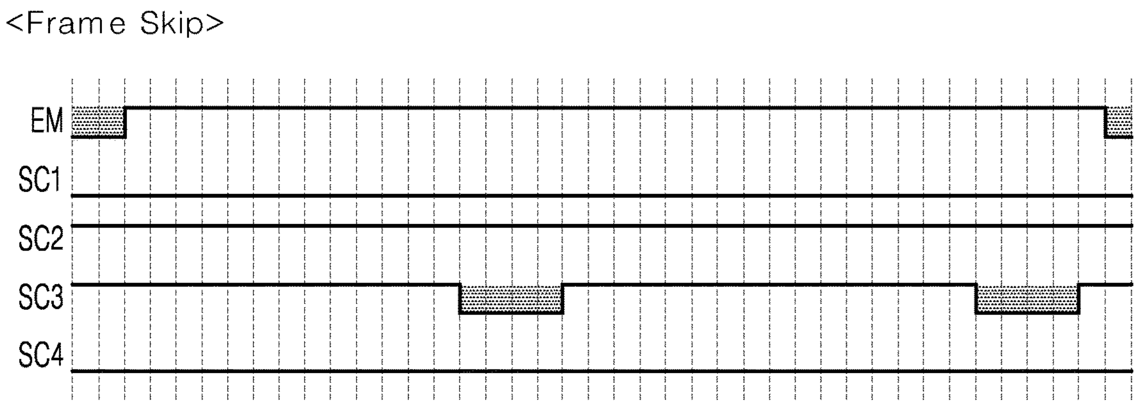
FIG. 3 is an example of a timing diagram of a frame skip period in the display device according to the exemplary embodiment of the present disclosure.
Figure 4:
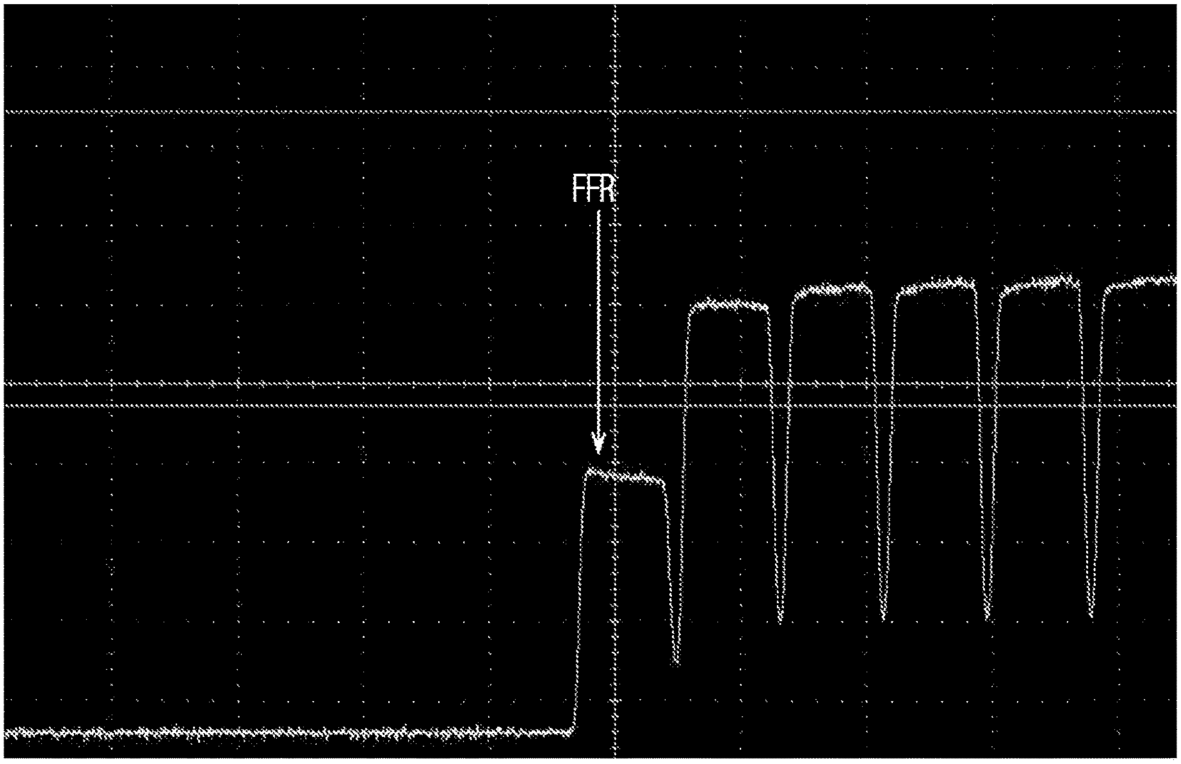
FIG. 4 is a diagram showing an example of a refresh measurement value for each frame of a refresh period in the display device according to the exemplary embodiment of the present disclosure.

FIG. 2 is a timing diagram of a refresh period in the display device according to the exemplary embodiment of the present disclosure. FIG. 3 is a timing diagram of a frame skip period in the display device according to the exemplary embodiment of the present disclosure. FIG. 4 is a diagram showing a refresh measurement value for each frame of a refresh period in the display device according to the exemplary embodiment of the present disclosure.

Referring to FIGS. 2 to 4, the display device according to the exemplary embodiment of the present disclosure can operate in a separate manner during a refresh period and a frame skip period. During the refresh period, the display device initializes the pixel circuit and programs the data voltage VDATA. In the present disclosure, each of the refresh and the frame skip can be a concept of a temporal period, and can have meaning such as an image or a driving mode, depending on circumstances.

In the display device according to the exemplary embodiment of the present disclosure, the refresh period can be divided into a stress period, an initialization period, and a sampling period.

The stress period is a period during which on bias voltage is applied to the source electrode of the driving transistor DTR to apply bias stress thereto. A second initialization voltage VINI2 is applied to the anode electrode of the light-emitting element OLED to initialize the same during the stress period.

The initialization period is a period during which a first initialization voltage VINI1 is applied to the storage capacitor Cst and the gate electrode of the driving transistor DTR to initialize the same. The sampling period is a period during which a threshold voltage Vth of the driving transistor DTR is sampled and the data voltage VDATA is programmed.

An emission period is a period during which the light-emitting element OLED emits light based on the driving current by a programmed source-gate voltage of the driving transistor DTR after the refresh period.

The display device according to the exemplary embodiment of the present disclosure skips data voltage programming in a frame skip period. The frame skip period includes the stress period. During the stress period, the bias voltage is applied to the source electrode of the driving transistor DTR to apply the bias stress thereto, and the anode electrode of the light-emitting element OLED is initialized with the second initialization voltage VINI2.

A driving timing of the display device according to the exemplary embodiment of the present disclosure is used for applying a voltage to the source electrode and the gate electrode of the driving transistor DTR, and is not used to charge the parasitic capacitor of the driving transistor DTR.

As recognized by the inventor of present disclosure, in the organic light-emitting display device, when luminance changes rapidly due to a problem in a pixel structure, the luminance does not immediately change to a target luminance but changes to intermediate luminance, and then changes to the target luminance, resulting in a poor first frame refresh (FFR) measurement value. As a result, a moving picture response time (MPRT) slows down and a smearing phenomenon occurs. A decrease in luminance in the first frame can affect the second and third frames.

In the display device according to the one or more exemplary embodiments of the present disclosure, the effect of the previous frame is reduced or completely excluded by charging the parasitic capacitor of the driving transistor with a certain voltage during the initialization period of the refresh period.

Figure 5:
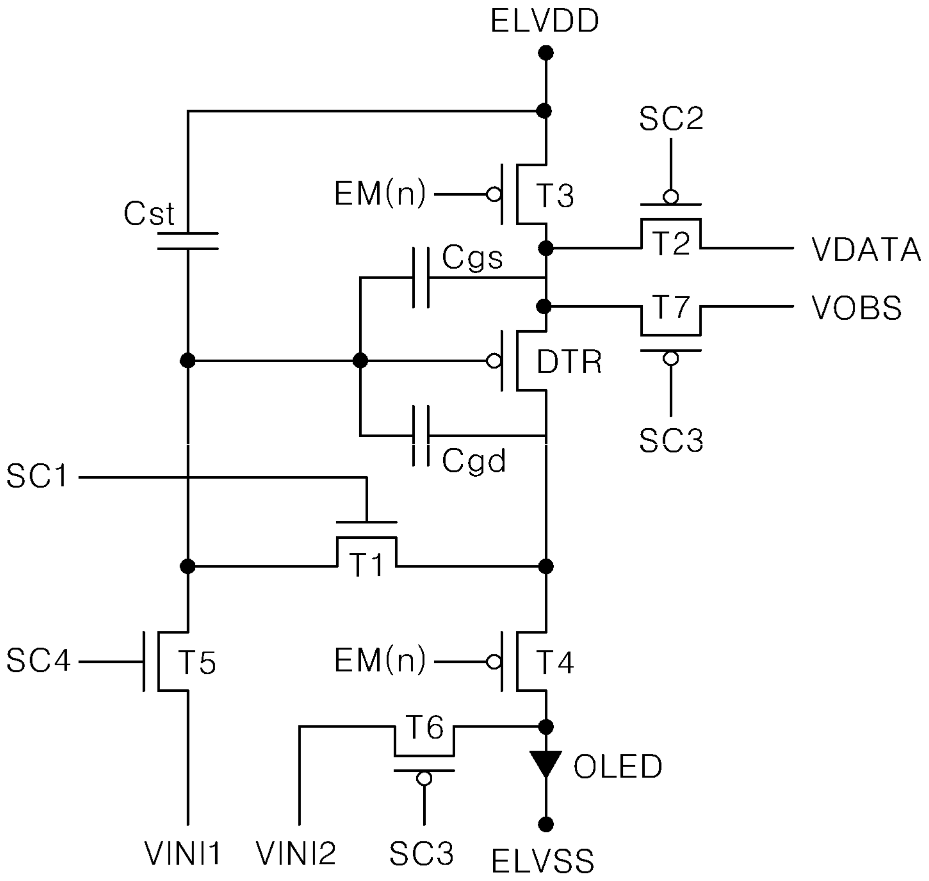
FIG. 5 is a circuit diagram showing a pixel circuit of a display device according to one or more exemplary embodiments of the present disclosure.
Figure 6:
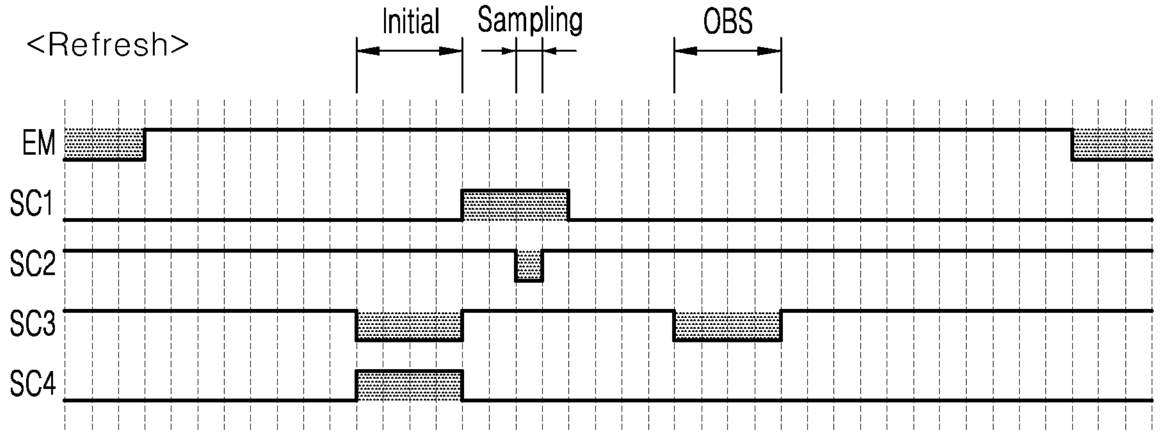
FIG. 6 is an example of a timing diagram of a refresh period in the display device according to the one or more exemplary embodiments of the present disclosure.
Figure 7:
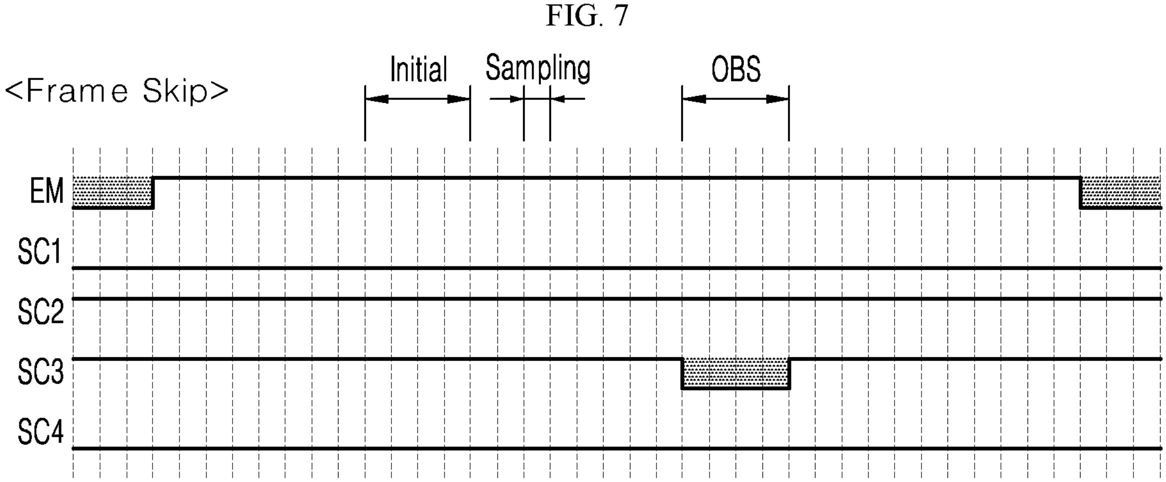
FIG. 7 is an example of a timing diagram of a frame skip period in the display device according to the one or more exemplary embodiments of the present disclosure.

FIG. 5 is a circuit diagram showing a pixel circuit of the display device according to the one or more exemplary embodiments of the present disclosure. FIG. 6 is a timing diagram of a refresh period in the display device according to the one or more exemplary embodiments of the present disclosure. FIG. 7 is a timing diagram of a frame skip period in the display device according to the one or more exemplary embodiments of the present disclosure.

Referring to FIGS. 5 to 7, the display device according to the one or more exemplary embodiments of the present disclosure includes a plurality of pixel circuits. Each of the plurality of pixel circuits includes the light-emitting element OLED, the driving transistor DTR, the first transistor T1, the second transistor T2, the third transistor T3, the fourth transistor T4, the fifth transistor T5, the sixth transistor T6, the seventh transistor T7, and a storage capacitor Cst. The light-emitting element OLED emits light based on the driving current. The light-emitting element OLED can include an anode electrode, a cathode electrode, and an organic light-emitting layer between the anode electrode and the cathode electrode. The driving transistor DTR controls the driving current, and includes the gate electrode, the source electrode and the drain electrode. The source electrode of the driving transistor DTR is applied with the data voltage VDATA, and the anode electrode of the light-emitting element OLED is coupled to the drain electrode of the driving transistor DTR. In another example, the source electrode of the driving transistor DTR can also be applied with an on bias stress voltage VOBS for a time period.

The first transistor T1 operates in response to a first scan signal SC1 and is connected to and disposed between the gate electrode and the drain electrode of the driving transistor DTR. The second transistor T2 operates in response to a second scan signal SC2 and applies the data voltage VDATA to the source electrode of the driving transistor DTR. The third transistor T3 operates in response to an emission signal EM(n) and applies a high-potential voltage ELVDD to the source electrode of the driving transistor DTR. The fourth transistor T4 operates in response to the emission signal EM(n) to generate a current path between the driving transistor DTR and the light-emitting element OLED. The fifth transistor T5 operates in response to a fourth scan signal SC4 and applies the first initialization voltage VINI1 to the gate electrode of the driving transistor DTR and the other electrode of the storage capacitor Cst. The sixth transistor T6 operates in response a third scan signal SC3 and applies the second initialization voltage VINI2 to the anode electrode of the light-emitting element OLED. The storage capacitor Cst has one electrode connected to the high-potential voltage ELVDD and the other electrode coupled to the gate electrode of the driving transistor DTR. The seventh transistor T7 operates in response to the third scan signal SC3 and applies an on bias stress voltage VOBS to the source electrode of the driving transistor DTR.

In one example, each of the driving transistor DTR, the second transistor T2, the third transistor T3, the fourth transistor T4, the sixth transistor T6, and the seventh transistor T7 can be embodied as a PMOS transistor which turns on when the gate voltage is at a low level, while each of the first transistor T1 and the fifth transistor T5 can be embodied as a NMOS transistor which turns on when the gate voltage is at a high level. However, the present disclosure is not limited thereto. For example, any one of the driving transistor DTR, the first transistor T1, the second transistor T2, the third transistor T3, the fourth transistor T4, the fifth transistor T5, the sixth transistor T6, and the seventh transistor T7 can be embodied as PMOS transistor or NMOS transistor.

The display device according to the one or more exemplary embodiments of the present disclosure can operate in a separate manner during a refresh period and a frame skip period. During the refresh period, the pixel circuit is initialized and the data voltage VDATA is programmed. During the frame skip period, the data voltage programming is skipped. The frame skip period includes the stress period. During the emission period, the light-emitting element OLED emits light based on the driving current by the source-gate voltage of the driving transistor DTR after the refresh period or the frame skip period.

In the display device according to the one or more exemplary embodiments of the present disclosure, the refresh period can be divided into an initialization period, a sampling period, and a stress period. During the initialization period in which the third scan signal SC3 is applied with low level and the fourth scan signal SC4 is applied with high level, the first initialization voltage VINI1 is applied to the storage capacitor Cst and the gate electrode of the driving transistor DTR, the on bias voltage VOBS is applied to the source electrode of the driving transistor DTR, and the second initialization voltage VINI2 is applied to the anode electrode of the light-emitting element OLED.

During the sampling period in which the second scan signal SC2 is applied with low level and the first scan signal SC1 is applied with high level, the drain electrode and gate electrode of the driving transistor DTR are connected to each other, the data voltage VDATA is applied to the source electrode of the driving transistor DTR to sample the threshold voltage Vth of the driving transistor DTR, and to program the data voltage VDATA. During the stress period in which the third scan signal SC3 is applied with low level, the on bias voltage VOBS is applied to the source electrode of the driving transistor DTR to apply the bias stress thereto, and the second initialization voltage VINI2 is applied to the anode electrode of the light-emitting element OLED.

In the display device according to the one or more exemplary embodiments of the present disclosure, the refresh period divided into the initialization period, the sampling period, and the stress period, the emission period, and the frame skip period will be described in detail as follows.

Figure 8:
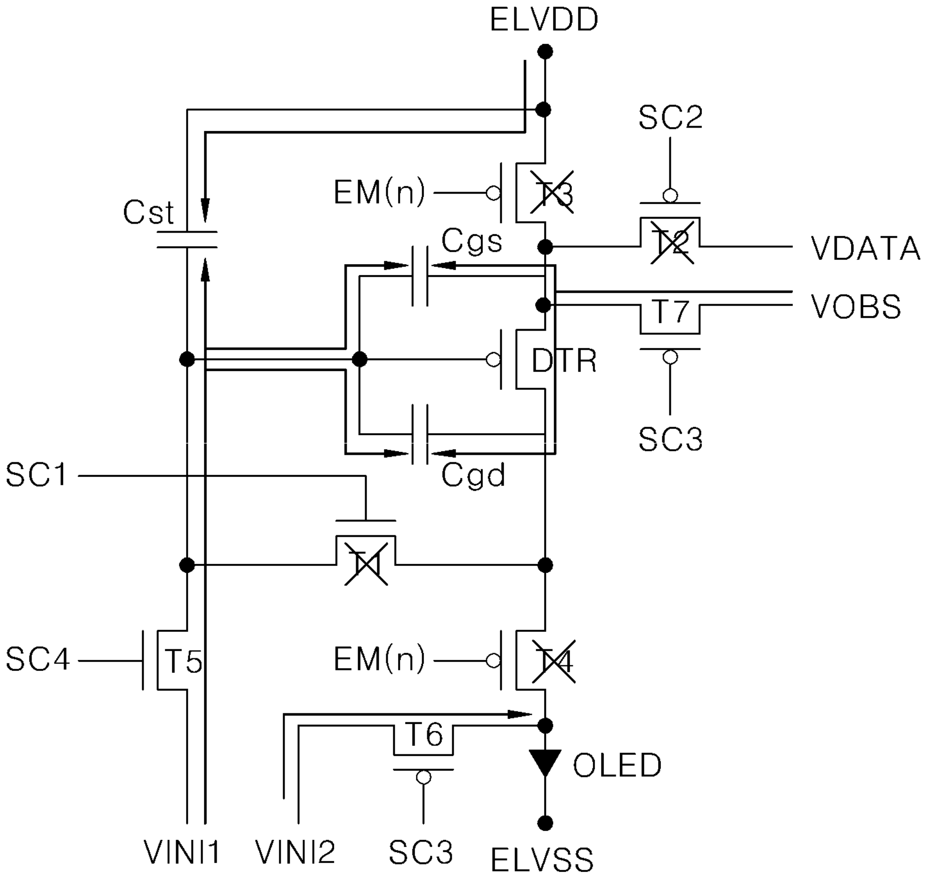
FIG. 8 is a circuit diagram showing an initialization operation of a refresh period in the display device according to the one or more exemplary embodiments of the present disclosure.
Figure 9:
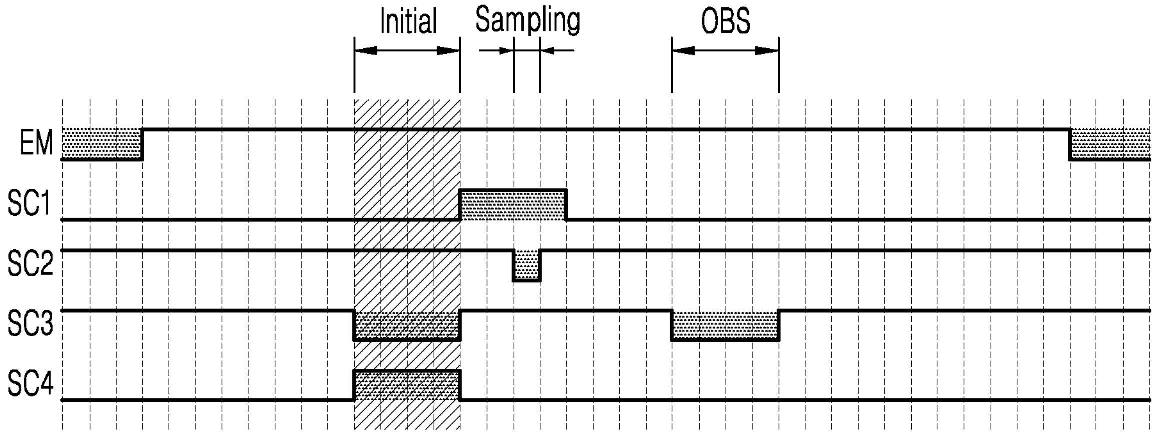
FIG. 9 is an example of a timing diagram showing an initialization operation of a refresh period in the display device according to the one or more exemplary embodiments of the present disclosure.

FIG. 8 is a circuit diagram showing an initialization operation of a refresh period in the display device according to the one or more exemplary embodiments of the present disclosure. FIG. 9 is a timing diagram showing an initialization operation of a refresh period in the display device according to the one or more exemplary embodiments of the present disclosure.

Referring to FIG. 8 and FIG. 9, during the initialization period of the refresh period in which the third scan signal SC3 is applied with low level and the fourth scan signal SC4 is applied with high level, the display device applies the high-potential voltage ELVDD to one electrode of the storage capacitor Cst and the first initialization voltage VINI1 to the other electrode thereof, and applies the second initialization voltage VINI2 to the anode electrode of the light-emitting element OLED, and applies the on bias stress voltage VOBS to the source electrode of the driving transistor DTR.

The fifth transistor T5 applies the first initialization voltage VINI1 to the gate electrode of the driving transistor DTR and the storage capacitor Cst in response to the fourth scan signal SC4 being high level. The sixth transistor T6 applies the second initialization voltage VINI2 to the anode electrode of the light-emitting element OLED in response to the third scan signal SC3 being low level. The seventh transistor T7 applies the on bias stress voltage VOBS to the source electrode of the driving transistor DTR in response to the third scan signal SC3 being low level.

The display device simultaneously applies the on bias stress voltage VOBS, the first initialization voltage VINI1, and the second initialization voltage VINI2 to initialize the storage capacitor Cst and at the same time, initialize parasitic capacitors, for example, but not limited to, Cgs and Cgd, of the driving transistor DTR. For example, the parasitic capacitor Cgs can be formed between the gate electrode and the source electrode of the driving transistor DTR, and the parasitic capacitor Cgd can be formed between the gate electrode and the drain electrode of the driving transistor DTR.

When the on-bias stress voltage VOBS is applied to the source electrode of the driving transistor DTR, the driving transistor DTR is turned on and is not affected by any previous data, and is in the same ready state.

In this way, the parasitic capacitor of the driving transistor is charged with a certain voltage during the initialization period of the refresh period, such that the influence of the previous frame can be reduced or completely excluded. Further, during the initialization period of the refresh period, the parasitic capacitor can be initialized by applying a certain voltage to the source electrode of the driving transistor, such that the luminance of the first frame can be improved.

Figure 10:
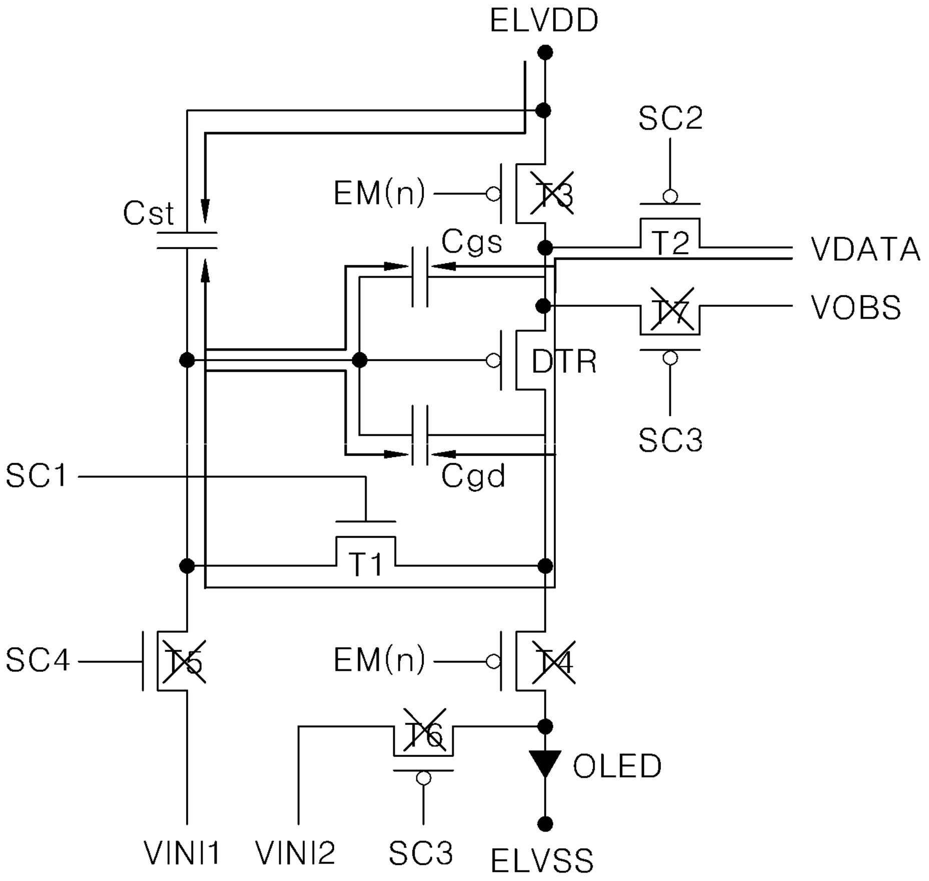
FIG. 10 is a circuit diagram showing a sampling operation of a refresh period in the display device according to the one or more exemplary embodiments of the present disclosure.
Figure 11:
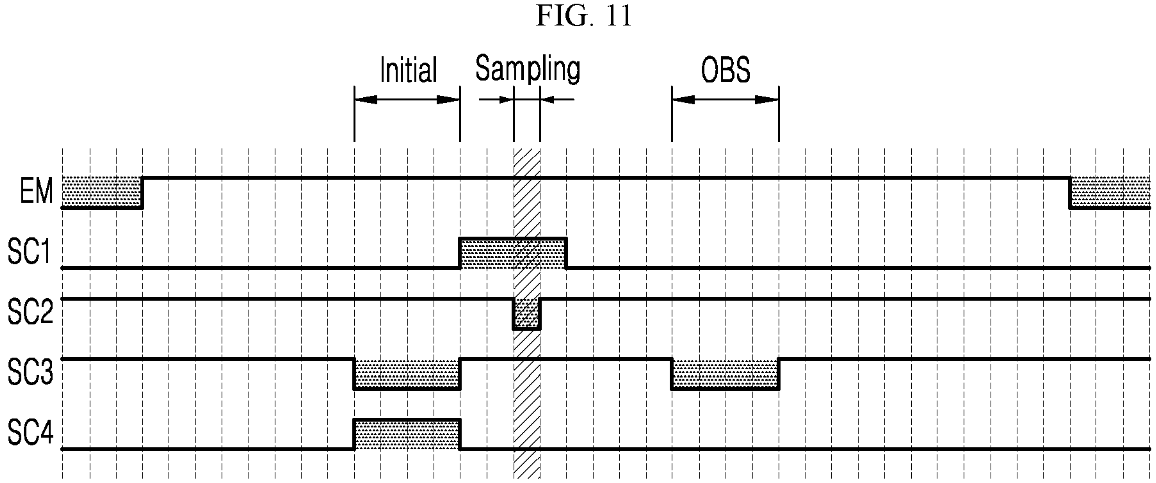
FIG. 11 is an example of a timing diagram showing a sampling operation of a refresh period in the display device according to the one or more exemplary embodiments of the present disclosure.

FIG. 10 is a circuit diagram showing a sampling operation of a refresh period in the display device according to the one or more exemplary embodiments of the present disclosure. FIG. 11 is a timing diagram showing a sampling operation of a refresh period in the display device according to the one or more exemplary embodiments of the present disclosure.

Referring to FIG. 10 and FIG. 11, during the sampling period of the refresh period in which the second scan signal SC2 is applied with low level, the first scan signal SC1 is applied with high level, the third scan signal SC3 is applied with high level and the fourth scan signal SC4 is applied with low level, the display device disables the application of the first initialization voltage VINI1 and the second initialization voltage VINI2 in response to the state of the third scan signal SC3 and the fourth scan signal SC4, and connects the gate electrode and the drain electrode of the driving transistor DTR to each other through the first transistor T1, and applies the data voltage VDATA to the source electrode of the driving transistor DTR through the second transistor T2.

The first transistor T1 connects the gate electrode and the drain electrode of the driving transistor DTR to each other in response to the first scan signal SC1 being high level. The second transistor T2 applies the data voltage VDATA to the source electrode of the driving transistor DTR in response to the second scan signal SC2 being low level.

In a step of sensing the threshold voltage Vth of the driving transistor DTR using a conduction in a diode manner, a voltage including the threshold voltage Vth and the data voltage VDATA is applied to the storage capacitor Cst. In this regard, the gate-source voltage Vgs of the driving transistor DTR is lowered and the driving transistor DTR is turned off.

Figure 12:
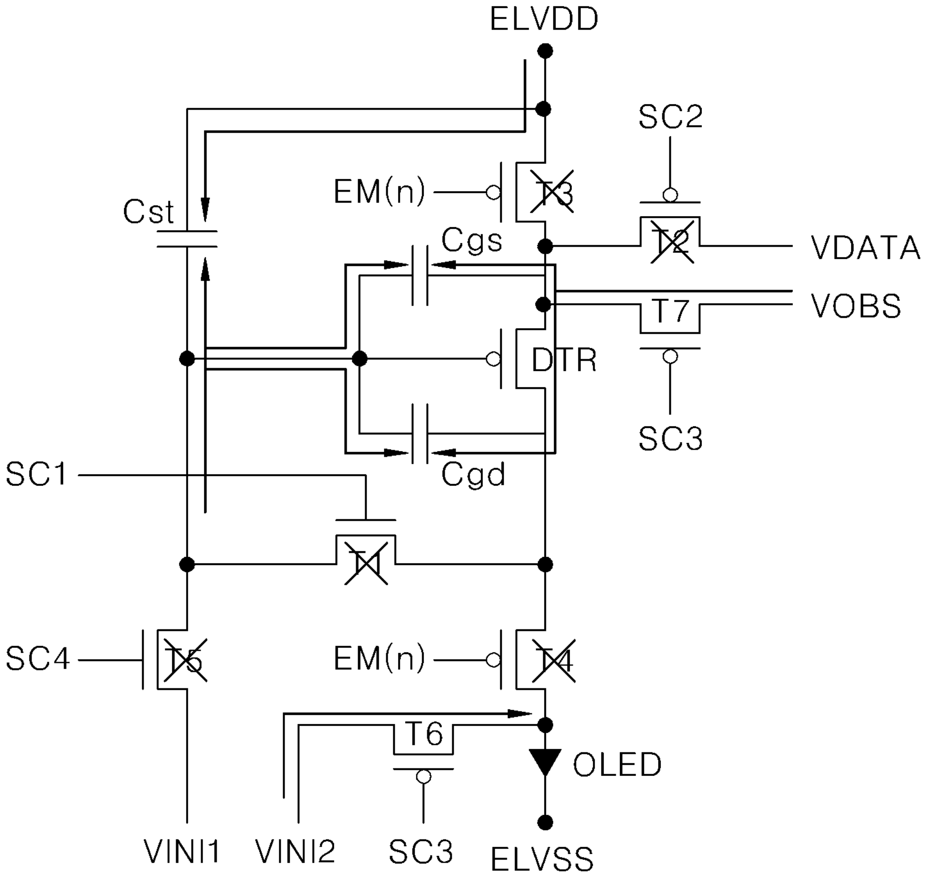
FIG. 12 is a circuit diagram showing an on bias stress operation of a refresh period in the display device according to the one or more exemplary embodiments of the present disclosure.
Figure 13:
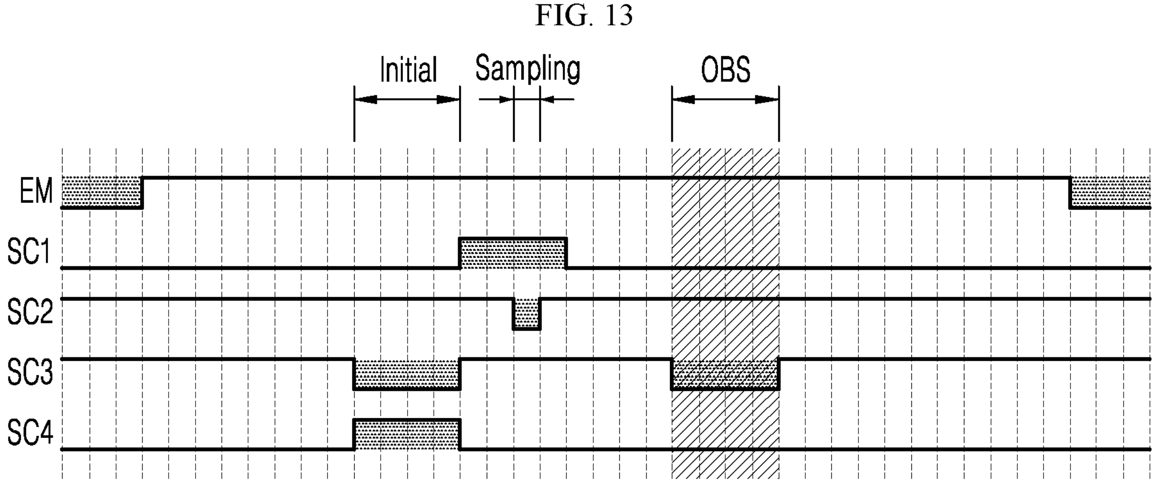
FIG. 13 is an example of a timing diagram showing an on bias stress operation of a refresh period in the display device according to the one or more exemplary embodiments of the present disclosure.

FIG. 12 is a circuit diagram showing an on bias stress operation of a refresh period in the display device according to the one or more exemplary embodiments of the present disclosure. FIG. 13 is a timing diagram showing an on bias stress operation of a refresh period in the display device according to the one or more exemplary embodiments of the present disclosure.

Referring to FIG. 12 and FIG. 13, during the stress period of the fresh period in which the second scan signal SC2 is applied with high level, the first scan signal SC1 is applied with low level, the third scan signal SC3 is applied with low level and the fourth scan signal SC4 is applied with low level, the display device breaks the connection between the gate electrode and the drain electrode of the driving transistor DTR in response to the first scan signal SC1, and applies the second initialization voltage VINI2 to the anode electrode of the light-emitting element OLED in response to the third scan signal SC3, and applies the on bias stress voltage VOBS to the source electrode of the driving transistor DTR in response to the third scan signal SC3.

The voltage of the gate electrode of the driving transistor DTR is fixed by the storage capacitor Cst, and the on bias stress voltage VOBS is applied to the source electrode of the driving transistor DTR to turn on the driving transistor DTR.

Figure 14:
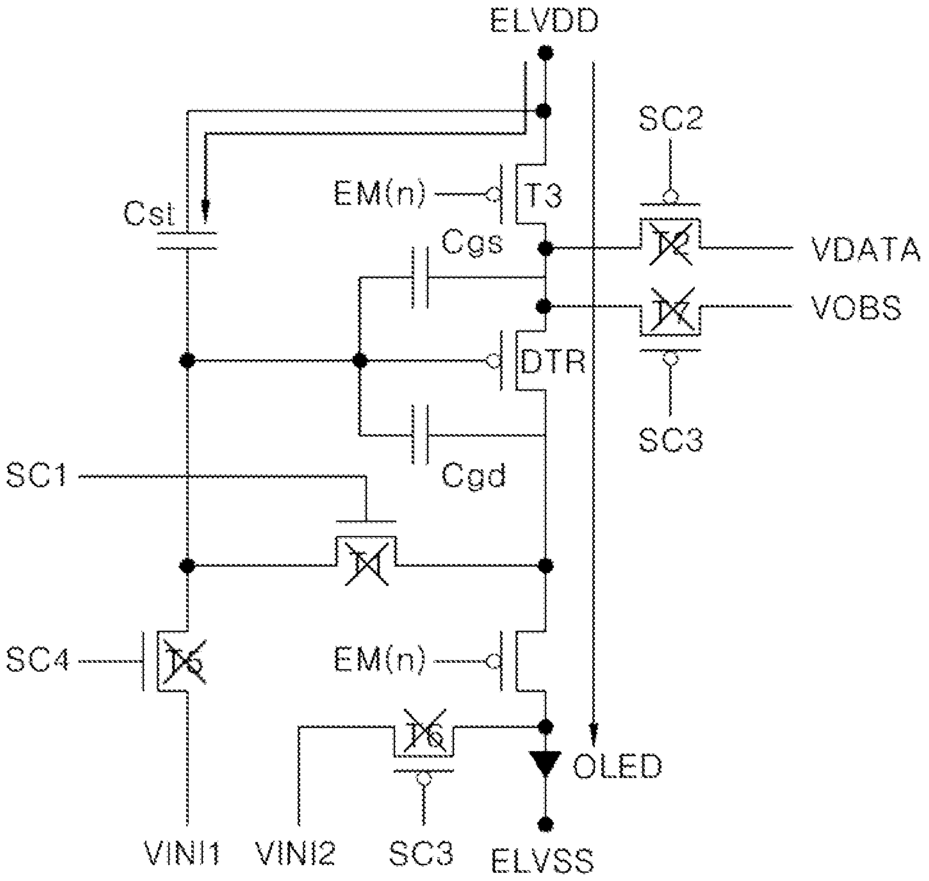
FIG. 14 is a circuit diagram showing an operation of an emission period in the display device according to the one or more exemplary embodiments of the present disclosure.
Figure 15:
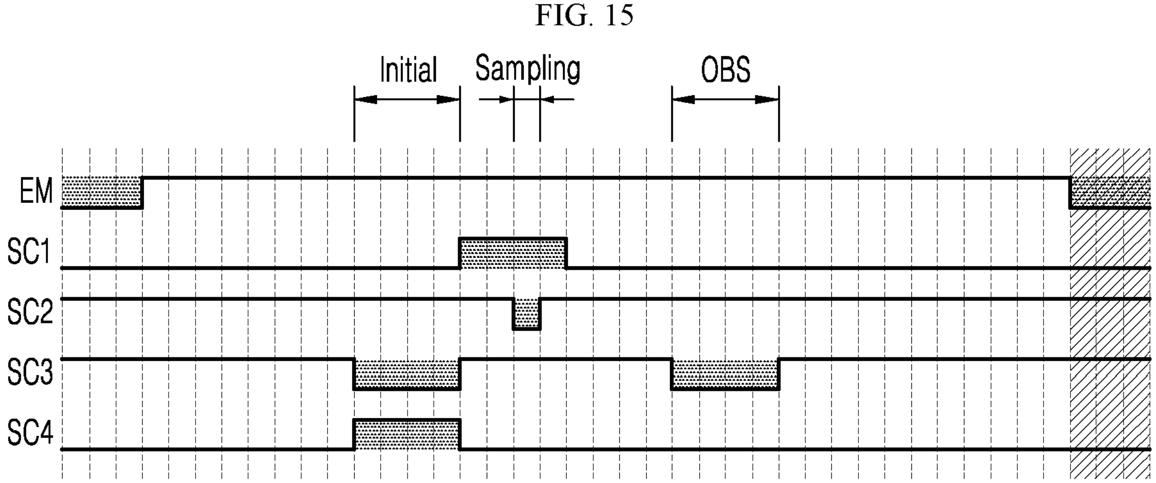
FIG. 15 is an example of a timing diagram showing an operation of an emission period in the display device according to the one or more exemplary embodiments of the present disclosure.

FIG. 14 is a circuit diagram showing an operation of an emission period in the display device according to the one or more exemplary embodiments of the present disclosure. FIG. 15 is a timing diagram showing the operation of the emission period in the display device according to the one or more exemplary embodiments of the present disclosure.

Referring to FIG. 14 and FIG. 15, during the emission period in which the second scan signal SC2 is applied with high level, the first scan signal SC1 is applied with low level, the third scan signal SC3 is applied with high level, the fourth scan signal SC4 is applied with low level and the emission signal EM(n) is applied with low level, the display device disables the application of the second initialization voltage VINI2 and the application of the on bias stress voltage VOBS, and applies the high-potential voltage ELVDD to the source electrode of the driving transistor DTR through the third transistor T3, and generates a current path between the driving transistor DTR and the light-emitting element OLED.

The third transistor T3 applies the high-potential voltage ELVDD to the source electrode of the driving transistor DTR in response to the emission signal EM(n) being low level. The fourth transistor T4. generates a current path between the driving transistor DTR and the light-emitting element OLED in response to the emission signal EM(n).

The third transistor T3 and the fourth transistor T4 are turned on such that the light-emitting element OLED emits light.

Figure 16:
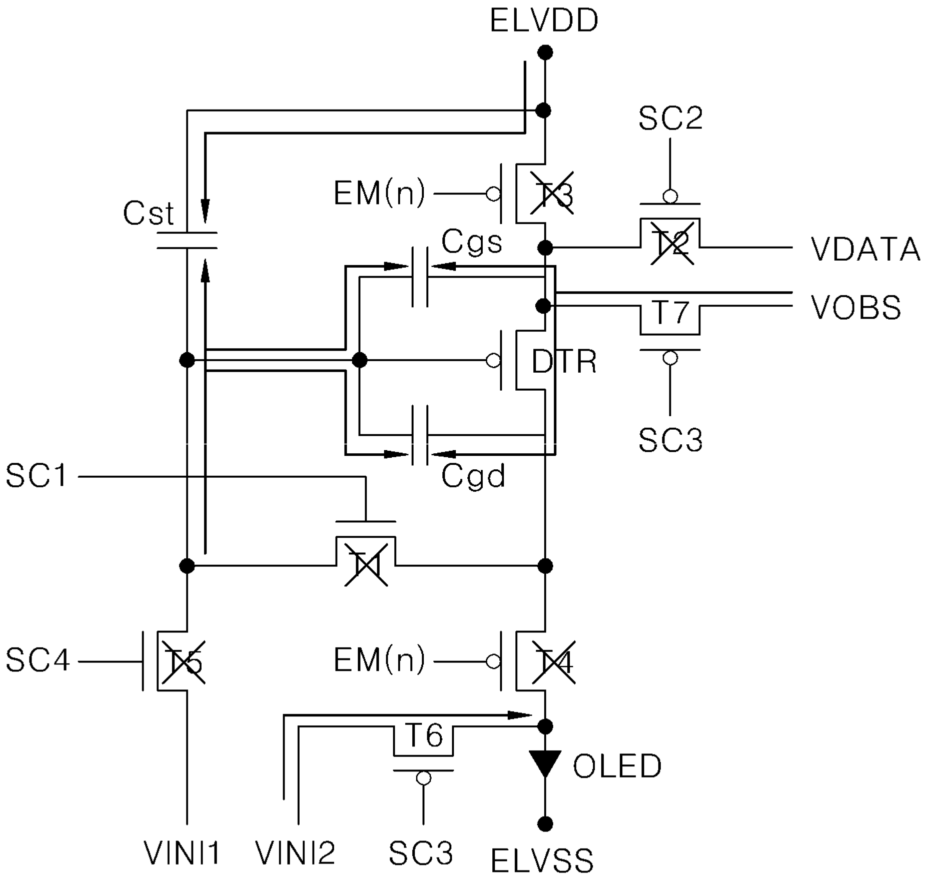
FIG. 16 is a circuit diagram showing an on bias stress operation of a holding period in the display device according to the one or more exemplary embodiments of the present disclosure.
Figure 17:
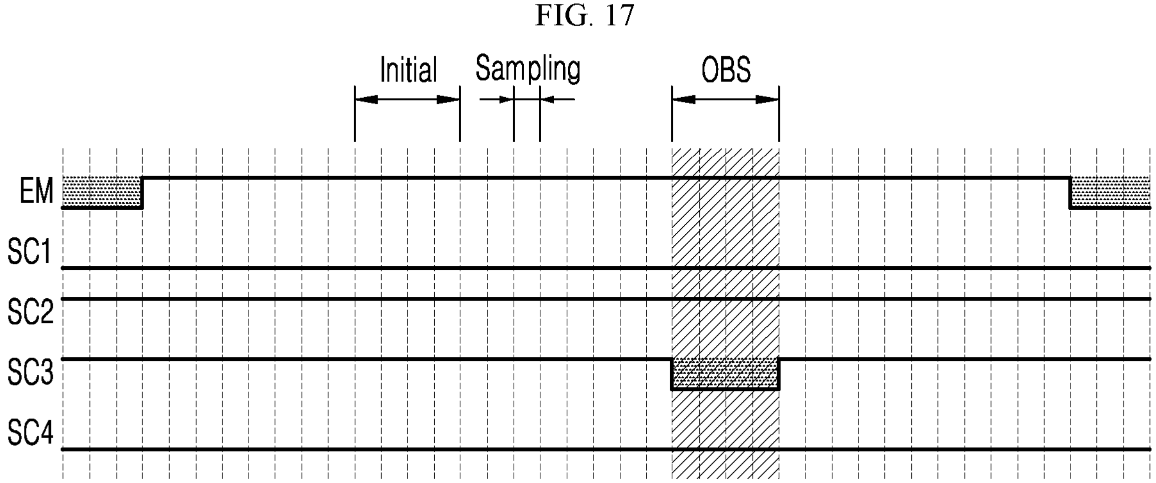
FIG. 17 is an example of a timing diagram showing an on bias stress operation of a holding period in the display device according to the one or more exemplary embodiments of the present disclosure.

FIG. 16 is a circuit diagram showing an on bias stress operation of a holding period in the display device according to the one or more exemplary embodiments of the present disclosure. FIG. 17 is a timing diagram showing the on bias stress operation of the holding period in the display device according to the one or more exemplary embodiments of the present disclosure.

In this regard, the holding period refers to the frame skip period as described above in which the programming of the data voltage VDATA is skipped.

Referring to FIG. 16 and FIG. 17, during the stress period of the holding period, the display device applies the second initialization voltage VINI2 to the anode electrode of the light-emitting element OLED through the sixth transistor T6, and applies the on bias stress voltage VOBS to the source electrode of the driving transistor DTR through the seventh transistor T7.

The display device initializes the anode electrode of the light-emitting element OLED and applies the on bias stress voltage VOBS to the source electrode of the driving transistor DTR such that the driving transistor DTR is in the same state as a state immediately after the sampling.

Figure 18:
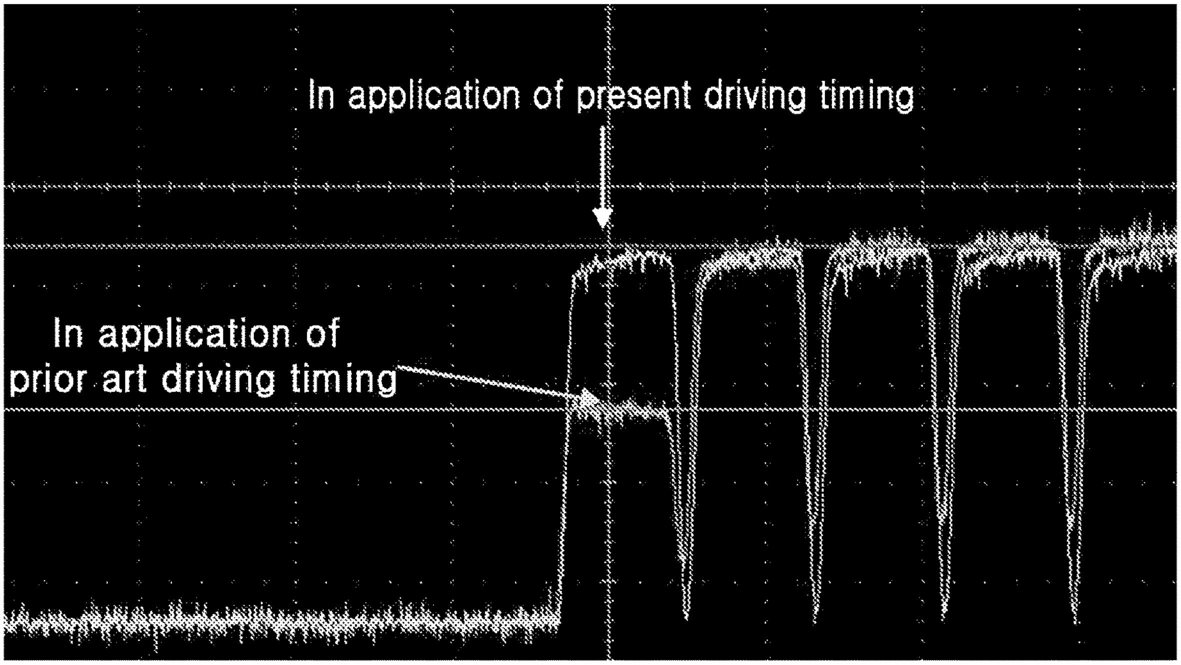
FIG. 18 is an example of a diagram comparing first frame refresh (FFR) performance at an OPR (On Pixel Ratio) of 1% in the display device according to the one or more exemplary embodiments of the present disclosure.

FIG. 18 is a diagram comparing FFR performance at an OPR (On Pixel Ratio) of 1% in the display device according to the one or more exemplary embodiments of the present disclosure as shown in FIGS. 5 and 6. It can be identified based on a result of comparing the FFR performance at the OPR of 1% that the FFR is improved compared to that in the exemplary embodiment shown in FIGS. 1 to 4.

Figure 19:
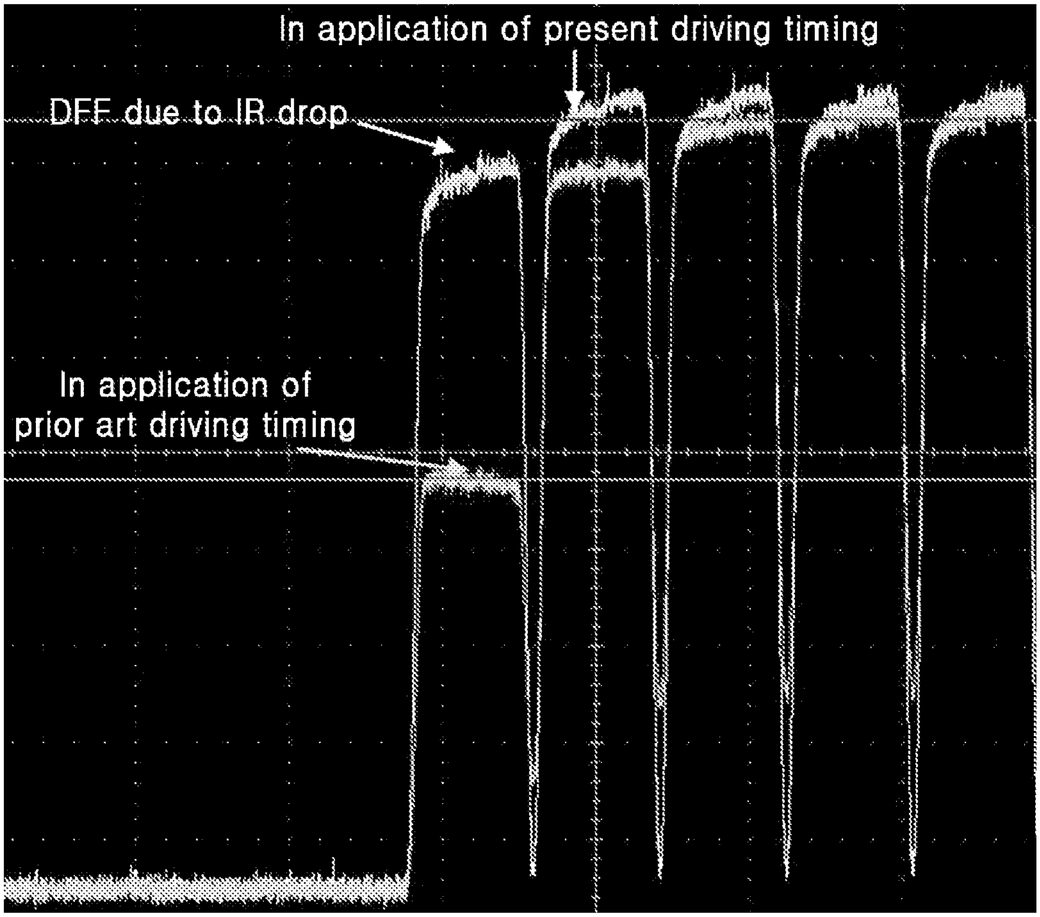
FIG. 19 is an example of a diagram comparing FFR performance at OPR of 100% in the display device according to the one or more exemplary embodiments of the present disclosure.

FIG. 19 is a diagram comparing FFR performance at the OPR of 100% in the display device according to the one or more exemplary embodiments of the present disclosure as shown in FIGS. 5 and 6. It can be identified based on a result of comparing the FFR performance at the OPR of 100% that FFR is improved compared to that in the exemplary embodiment shown in FIGS. 1 to 4, although FFR degradation occurs due to driving current drop.

In one example, the display device can include a display panel including a plurality of pixels, and a driver for driving the plurality of pixels, and a controller. In one example, the driver can include a gate driver supplying a gate signal to each of the plurality of pixels and a data driver supplying a data signal to each of the plurality of pixels.

The controller processes the image data input from an external device so as to be adapted to the size and the resolution of the display panel and supplies the processed image data to the data driver. The controller can generate a plurality of gate and data control signals, and a light-emission control signal using synchronization signals input from an external device, for example, a dot clock signal, a data enable signal, a horizontal synchronization signal, and a vertical synchronization signal, and can supply the plurality of gate and data control signals, and the light-emission control signal to the gate driver and the data driver.

The controller can be embodied as a combination of various processors, for example, a micro-processor, a mobile processor, an application processor, etc., depending on a type of a device on which the controller is mounted.

The controller can generate a signal so that the pixel can operate at various refresh rates. In one example, the controller can generate signals associated with the operation such that the pixel operates in a VRR (Variable Refresh Rate) mode or is switchable to between the first refresh rate and the second refresh rate. For example, the controller can simply change a rate of the clock signal, generate a sync signal to create a horizontal blank or a vertical blank, or drive the gate driver in a mask scheme such that the pixel operates at various refresh rates.

A first aspect of the present disclosure provides a pixel circuit comprising: a light-emitting element OLED for emitting light based on driving current; a driving transistor DTR configured to control the driving current, wherein the driving transistor DTR includes a gate electrode, a source electrode, and a drain electrode, wherein a data voltage VDATA is applied to the source electrode thereof, wherein an anode electrode of the light-emitting element OLED is coupled to the drain electrode thereof; and a storage capacitor Cst having one electrode connected to a high-potential voltage and the other electrode coupled to the gate electrode of the driving transistor DTR, wherein during an initialization period of a refresh period of a display device including the pixel circuit, the pixel circuit is configured to apply a first initialization voltage VINI1 to the other electrode of the storage capacitor Cst, and to apply a second initialization voltage VINI2 to the anode electrode of the light-emitting element OLED, and to apply an on bias stress voltage VOBS to the source electrode of the driving transistor DTR.

In one implementation of the first aspect, during a sampling period of the refresh period, the pixel circuit is configured to disable the application of the first initialization voltage VINI1 and the second initialization voltage VINI2, and to connect the gate electrode and the drain electrode of the driving transistor DTR to each other, and to apply the data voltage VDATA to the source electrode of the driving transistor DTR.

In one implementation of the first aspect, the pixel circuit further includes a fifth transistor T5 configured to apply the first initialization voltage VINI1 to the gate electrode of the driving transistor DTR; a sixth transistor T6 configured to apply the second initialization voltage VINI2 to the anode electrode of the light-emitting element OLED; and a seventh transistor T7 configured to apply the on bias stress voltage VOBS to the source electrode of the driving transistor DTR.

In one implementation of the first aspect, the pixel circuit further includes a first transistor T1 connected to and disposed between the gate electrode and the drain electrode of the driving transistor DTR; and a second transistor T2 configured to apply the data voltage VDATA to the source electrode of the driving transistor DTR.

In one implementation of the first aspect, during a stress period of the refresh period, the pixel circuit is configured to break the connection between the gate electrode and the drain electrode of the driving transistor DTR, and to apply the second initialization voltage VINI2 to the anode electrode of the light-emitting element OLED, and to apply the on bias stress voltage VOBS to the source electrode of the driving transistor DTR.

In one implementation of the first aspect, during an emission period of the display device, the pixel circuit is configured to disable the application of the second initialization voltage VINI2 and the application of the on bias stress voltage VOBS, and to apply the high-potential voltage to the source electrode of the driving transistor DTR, and to generate a current path between the driving transistor DTR and the light-emitting element OLED.

In one implementation of the first aspect, the pixel circuit further includes a third transistor T3 configured to apply the high-potential voltage to the source electrode of the driving transistor DTR; and a fourth transistor T4 configured to generate the current path between the driving transistor DTR and the light-emitting element OLED.

In one implementation of the first aspect, during a stress period of a holding period of the display device, the pixel circuit is configured to apply the second initialization voltage VINI2 to the anode electrode of the light-emitting element OLED, and to apply the on bias stress voltage VOBS to the source electrode of the driving transistor DTR.

A second aspect of the present disclosure provides a display device comprising: a display panel including a plurality of pixel circuits; and a driver for driving the display panel, wherein each of the plurality of pixel circuits includes: a light-emitting element OLED for emitting light based on driving current; a driving transistor DTR configured to control the driving current, wherein the driving transistor DTR includes a gate electrode, a source electrode, and a drain electrode, wherein a data voltage VDATA is applied to the source electrode thereof, wherein an anode electrode of the light-emitting element OLED is coupled to the drain electrode thereof; and a storage capacitor Cst having one electrode connected to a high-potential voltage and the other electrode coupled to the gate electrode of the driving transistor DTR, wherein during an initialization period of a refresh period of the display device, each pixel circuit is configured to apply a first initialization voltage VINI1 to the other electrode of the storage capacitor Cst, and to apply a second initialization voltage VINI2 to the anode electrode of the light-emitting element OLED, and to apply an on bias stress voltage VOBS to the source electrode of the driving transistor DTR.

In one implementation of the second aspect, each of the plurality of pixel circuits further includes: a fifth transistor T5 configured to apply the first initialization voltage VINI1 to the gate electrode of the driving transistor DTR; a sixth transistor T6 configured to apply the second initialization voltage VINI2 to the anode electrode of the light-emitting element OLED; and a seventh transistor T7 configured to apply the on bias stress voltage VOBS to the source electrode of the driving transistor DTR.

In one implementation of the second aspect, each of the plurality of pixel circuits includes: a first transistor T1 connected to and disposed between the gate electrode and the drain electrode of the driving transistor DTR; and a second transistor T2 configured to apply the data voltage VDATA to the source electrode of the driving transistor DTR, wherein during a sampling period of the refresh period, each pixel circuit is configured to disable the application of the first initialization voltage VINI1 and the second initialization voltage VINI2, and to connect the gate electrode and the drain electrode of the driving transistor DTR to each other, and to apply the data voltage VDATA to the source electrode of the driving transistor DTR.

In one implementation of the second aspect, during a stress period of the refresh period, each pixel circuit is configured to break the connection between the gate electrode and the drain electrode of the driving transistor DTR, and to apply the second initialization voltage VINI2 to the anode electrode of the light-emitting element OLED, and to apply the on bias stress voltage VOBS to the source electrode of the driving transistor DTR.

In one implementation of the second aspect, each of the plurality of pixel circuits includes: a third transistor T3 configured to apply the high-potential voltage to the source electrode of the driving transistor DTR; and a fourth transistor T4 configured to generate the current path between the driving transistor DTR and the light-emitting element OLED, wherein during an emission period of the display device, each pixel circuit is configured to disable the application of the second initialization voltage VINI2 and the application of the on bias stress voltage VOBS, and to apply the high-potential voltage to the source electrode of the driving transistor DTR, and to generate a current path between the driving transistor DTR and the light-emitting element OLED.

In one implementation of the second aspect, during a stress period of a holding period of the display device, each pixel circuit is configured to apply the second initialization voltage VINI2 to the anode electrode of the light-emitting element OLED, and to apply the on bias stress voltage VOBS to the source electrode of the driving transistor DTR.

A third aspect of the present disclosure provides a display device comprising a plurality of pixel circuits, wherein each of the plurality of pixel circuits includes: a light-emitting element OLED for emitting light based on driving current; a driving transistor DTR configured to control the driving current, wherein the driving transistor DTR includes a gate electrode, a source electrode, and a drain electrode; a first transistor T1 connected to and disposed between the gate electrode and the drain electrode of the driving transistor DTR; a second transistor T2 configured to apply a data voltage VDATA to the source electrode of the driving transistor DTR; a third transistor T3 configured to apply a high-potential voltage to the source electrode of the driving transistor DTR; a fourth transistor T4 configured to generate a current path between the driving transistor DTR and the light-emitting element OLED; a fifth transistor T5 configured to apply a first initialization voltage VINI1 to the gate electrode of the driving transistor DTR; a sixth transistor T6 configured to apply a second initialization voltage VINI2 to an anode electrode of the light-emitting element OLED; a storage capacitor Cst having one electrode connected to the high-potential voltage and the other electrode coupled to the gate electrode of the driving transistor DTR; and a seventh transistor T7 configured to apply an on bias stress voltage VOBS to the source electrode of the driving transistor DTR.

In one implementation of the third aspect, during an initialization period of a refresh period of the display device, each pixel circuit is configured to apply the first initialization voltage VINI1 to the other electrode of the storage capacitor Cst, and to apply the second initialization voltage VINI2 to the anode electrode of the light-emitting element OLED, and to apply the on bias stress voltage VOBS to the source electrode of the driving transistor DTR.

In one implementation of the third aspect, during a sampling period of the refresh period, each pixel circuit is configured to disable the application of the first initialization voltage VINI1 and the second initialization voltage VINI2, and to connect the gate electrode and the drain electrode of the driving transistor DTR to each other, and to apply the data voltage VDATA to the source electrode of the driving transistor DTR.

In one implementation of the third aspect, during a stress period of the refresh period, each pixel circuit is configured to break the connection between the gate electrode and the drain electrode of the driving transistor DTR, and to apply the second initialization voltage VINI2 to the anode electrode of the light-emitting element OLED, and to apply the on bias stress voltage VOBS to the source electrode of the driving transistor DTR.

In one implementation of the third aspect, during an emission period of the display device, each pixel circuit is configured to disable the application of the second initialization voltage VINI2 and the application of the on bias stress voltage VOBS, and to apply the high-potential voltage to the source electrode of the driving transistor DTR, and to generate a current path between the driving transistor DTR and the light-emitting element OLED.

In one implementation of the third aspect, during a stress period of a holding period of the display device, each pixel circuit is configured to apply the second initialization voltage VINI2 to the anode electrode of the light-emitting element OLED, and to apply the on bias stress voltage VOBS to the source electrode of the driving transistor DTR.

According to embodiments, during the initialization period of the refresh period, the parasitic capacitor of the driving transistor can be charged with a certain voltage, such that the influence of the previous frame can be reduced or completely excluded.

Further, during the initialization period of the refresh period, a certain voltage can be applied to the source electrode of the driving transistor to initialize the parasitic capacitor, such that the luminance of the first frame can be improved.

Further, the luminance of the first frame can be improved to reduce or prevent the luminance of the second and third frames from being adversely affected by the lowered luminance of the first frame, such that the image quality can be improved.

Although the embodiments of the present disclosure have been described in more detail with reference to the accompanying drawings, the present disclosure is not necessarily limited to these embodiments, and can be modified in a various manner within the scope of the technical idea of the present disclosure. Accordingly, the embodiments as disclosed in the present disclosure are intended to describe rather than limit the technical idea of the present disclosure, and the scope of the technical idea of the present disclosure is not limited by these embodiments. Therefore, it should be understood that the embodiments described above are not restrictive but illustrative in all respects. The scope of protection of the present disclosure should be interpreted according to the scope of claims, and all technical ideas within an equivalent scope thereto should be interpreted as being included in the scope of rights of the present disclosure.

What is claimed is:

1. A pixel circuit for a display device, the pixel circuit comprising:

a light-emitting element including an anode electrode and configured to emit light based on a driving current;

a driving transistor including a drain electrode, a source electrode and a gate electrode, and configured to control the driving current, wherein the anode electrode of the light-emitting element is coupled to the drain electrode of the driving transistor;

a storage capacitor having a first electrode connected to a high-potential voltage and a second electrode coupled to the gate electrode of the driving transistor;

a third transistor configured to apply the high-potential voltage to the source electrode of the driving transistor, in response to an emission signal;

a fourth transistor configured to generate a current path between the driving transistor and the light-emitting element, in response to the emission signal;

a fifth transistor configured to apply a first initialization voltage to the gate electrode of the driving transistor; and a seventh transistor configured to apply an on bias stress voltage to the source electrode of the driving transistor, wherein during an initialization period of a refresh period of the display device, the pixel circuit is configured to apply the first initialization voltage to the second electrode of the storage capacitor, to apply a second initialization voltage to the anode electrode of the light-emitting element, and to apply the on bias stress voltage to the source electrode of the driving transistor, wherein during the initialization period of the refresh period in a first time, a first parasitic capacitor and a second parasitic capacitor of the driving transistor are charged to the on bias stress voltage, wherein the first parasitic capacitor is formed between the gate electrode and the source electrode of the driving transistor, and the second parasitic capacitor is formed between the gate electrode and the drain electrode of the driving transistor, wherein during the initialization period of the refresh period in a first frame, the first initialization voltage is applied to each of one electrode of the first parasitic capacitor and the second parasitic capacitor, and the gate electrode of the driving transistor, the on bias stress voltage is applied to another electrode of the first parasitic capacitor, and the on bias stress voltage is applied to another electrode of the second parasitic capacitor through the driving transistor, wherein the fifth transistor is a NMOS transistor and operates in response to a fourth scan signal applied with a high level during the initialization period, and the seventh transistor is a PMOS transistor and operates in response to a third scan signal applied with a low level during the initialization period, wherein the pixel circuit is configured, after the initialization period, to disable application of the first initialization voltage and the second initialization voltage, to connect the gate electrode and the drain electrode of the driving transistor to each other, and, after a certain time has elapsed, to apply a data voltage to the source electrode of the driving transistor during a sampling period of the refresh period, wherein the pixel circuit is configured, after the refresh period, to perform a holding operation during a frame skip period by supplying a single high pulse of the emission signal to the third and fourth transistors, and supplying a single low pulse of the third scan signal during a period of the single high pulse of the emission signal to simultaneously supply the second initialization voltage to the anode electrode of the light-emitting element and the on bias stress voltage to the source electrode of the driving transistor, wherein the first parasitic capacitor and the second parasitic capacitor are charged with the on bias stress voltage during a stress period of the frame skip period, and wherein only two low pulses of the third scan signal are supplied during the refresh period in the first frame, and only the single low pulse for the third scan signal is supplied during the frame skip period.

2. The pixel circuit of claim 1, wherein during the initialization period of the refresh period, the driving transistor is turned on.

3. The pixel circuit of claim 1, further comprising:

a sixth transistor configured to apply the second initialization voltage to the anode electrode of the light-emitting element.

4. The pixel circuit of claim 3, further comprising:

a first transistor connected to and disposed between the gate electrode and the drain electrode of the driving transistor; and a second transistor configured to apply the data voltage to the source electrode of the driving transistor.

5. The pixel circuit of claim 4, wherein the first transistor and the second transistor are configured to turn on in response to a first scan signal and a second scan signal, respectively.

6. The pixel circuit of claim 1, wherein during a stress period of the refresh period, the pixel circuit is configured to:

break a connection between the gate electrode and the drain electrode of the driving transistor, apply the second initialization voltage to the anode electrode of the light-emitting element, and apply the on bias stress voltage to the source electrode of the driving transistor.

7. The pixel circuit of claim 6, wherein during an emission period of the display device, the pixel circuit is configured to:

disable the application of the second initialization voltage and the application of the on bias stress voltage, apply the high-potential voltage to the source electrode of the driving transistor, and generate the current path between the driving transistor and the light-emitting element.

8. The pixel circuit of claim 7, wherein during a stress period of a holding period of the display device, the pixel circuit is configured to:

apply the second initialization voltage to the anode electrode of the light-emitting element, and apply the on bias stress voltage to the source electrode of the driving transistor.

9. The pixel circuit of claim 7, further comprising:

a first transistor connected to and disposed between the gate electrode and the drain electrode of the driving transistor; and a second transistor configured to apply the data voltage to the source electrode of the driving transistor, wherein the first transistor is an NMOS transistor, and wherein the second transistor, the third transistor and the fourth transistor are PMOS transistors.

10. A display device comprising:

a display panel including a plurality of pixel circuits, wherein each of the plurality of pixel circuits is the pixel circuit according to claim 1.

11. A display device comprising:

a plurality of pixel circuits, wherein each of the plurality of pixel circuits includes:

a light-emitting element configured to emit light based on a driving current;

a driving transistor having a gate electrode, a drain electrode and a source electrode, and configured to control the driving current;

a first transistor connected to and disposed between the gate electrode and the drain electrode of the driving transistor;

a second transistor configured to apply a data voltage to the source electrode of the driving transistor;

a third transistor configured to apply a high-potential voltage to the source electrode of the driving transistor, in response to an emission signal;

a fourth transistor configured to generate a current path between the driving transistor and the light-emitting element, in response to an emission signal;

a fifth transistor configured to apply a first initialization voltage to the gate electrode of the driving transistor;

a storage capacitor having one electrode connected to the high-potential voltage and another electrode coupled to the gate electrode of the driving transistor; and a seventh transistor configured to apply an on bias stress voltage to the source electrode of the driving transistor, wherein during an initialization period of a refresh period in a first frame, a first parasitic capacitor and a second parasitic capacitor of the driving transistor are charged to the on bias stress voltage, wherein the first parasitic capacitor is formed between the gate electrode and the source electrode of the driving transistor, and the second parasitic capacitor is formed between the gate electrode and the drain electrode of the driving transistor, wherein during the initialization period of the refresh period in the first frame, the first initialization voltage is applied to each of one electrode of the first parasitic capacitor and the second parasitic capacitor, and the gate electrode of the driving transistor, a second initialization voltage is applied to an anode electrode of the light-emitting element, the on bias stress voltage is applied to another electrode of the first parasitic capacitor, and the on bias stress voltage is applied to another electrode of the second parasitic capacitor through the driving transistor, wherein the fifth transistor is a NMOS transistor and operates in response to a fourth scan signal applied with a high level during the initialization period, and the seventh transistor is a PMOS transistor and operates in response to a third scan signal applied with a low level during the initialization period, wherein the pixel circuit is configured, after the initialization period, to disable application of the first initialization voltage and the second initialization voltage, to connect the gate electrode and the drain electrode of the driving transistor to each other, and, after a certain time has elapsed, to apply a data voltage to the source electrode of the driving transistor during a sampling period of the refresh period, wherein the pixel circuit is configured, after the refresh period, to perform a holding operation during a frame skip period by supplying a single high pulse of the emission signal to the third and fourth transistors, and supplying a single low pulse of the third scan signal during a period of the single high pulse of the emission signal to simultaneously supply the second initialization voltage to the anode electrode of the light-emitting element and the on bias stress voltage to the source electrode of the driving transistor, wherein the first parasitic capacitor and the second parasitic capacitor are charged with the on bias stress voltage during a stress period of the frame skip period, and wherein only two low pulses of the third scan signal are supplied during the refresh period in the first frame, and only the single low pulse for the third scan signal is supplied during the frame skip period.

12. The display device of claim 11, wherein each of the plurality of pixel circuits further includes a sixth transistor configured to apply a second initialization voltage to an anode electrode of the light-emitting element.

13. The display device of claim 11, wherein during the initialization period of the refresh period of the display device, each of the plurality of pixel circuits is configured to apply the first initialization voltage to the another electrode of the storage capacitor, and apply the on bias stress voltage to the source electrode of the driving transistor.

14. The display device of claim 13, wherein during the initialization period of the refresh period, the driving transistor is turned on.

15. The display device of claim 11, wherein during a stress period of the refresh period, each of the plurality of pixel circuits is configured to:

break a connection between the gate electrode and the drain electrode of the driving transistor, apply the second initialization voltage to the anode electrode of the light-emitting element, and apply the on bias stress voltage to the source electrode of the driving transistor.

16. The display device of claim 15, wherein during an emission period of the display device, each of the plurality of pixel circuits is configured to:

disable the application of the second initialization voltage and the application of the on bias stress voltage, apply the high-potential voltage to the source electrode of the driving transistor, and generate a current path between the driving transistor and the light-emitting element.

17. The display device of claim 15, wherein during a stress period of a holding period of the display device, each of the plurality of pixel circuits is configured to apply the second initialization voltage to the anode electrode of the light-emitting element, and apply the on bias stress voltage to the source electrode of the driving transistor.

* * * * *